United States Patent
Meli et al.

(10) Patent No.: US 6,688,338 B2
(45) Date of Patent: Feb. 10, 2004

(54) SECONDARY CONTAINMENT SYSTEM FOR PIPELINES

(76) Inventors: Paul Meli, 1831 Blount Rd., Pompano Beach, FL (US) 33069; Shanda Lee, 1831 Blount Rd., Pompano Beach, FL (US) 33069; Andy House, 1831 Blount Rd., Pompano Beach, FL (US) 33069

( * ) Notice: Subject to any disclaimer, the term of this patent is extended or adjusted under 35 U.S.C. 154(b) by 35 days.

(21) Appl. No.: 10/027,028

(22) Filed: Dec. 26, 2001

(65) Prior Publication Data

US 2003/0116214 A1 Jun. 26, 2003

(51) Int. Cl.$^7$ .................................................. F16L 11/00
(52) U.S. Cl. ........................ 138/123; 138/124; 138/145; 138/137; 138/140; 428/36.1
(58) Field of Search .................... 138/145, 146, 138/114, 104, 137, 140, 141, 124, 123; 428/86, 36.1

(56) References Cited

U.S. PATENT DOCUMENTS

| | | | |
|---|---|---|---|
| 3,882,382 A | | 5/1975 | Johnson ..................... 324/65 R |
| 3,945,867 A | * | 3/1976 | Heller et al. ................ 156/143 |
| 4,468,609 A | | 8/1984 | Schmitz .................. 324/61 QS |
| 4,523,454 A | | 6/1985 | Sharp .......................... 73/49.2 |
| 4,653,312 A | | 3/1987 | Sharp .......................... 73/49.2 |
| 4,696,186 A | | 9/1987 | Sharp .......................... 73/49.2 |
| 4,789,005 A | * | 12/1988 | Griffiths ..................... 138/103 |
| 4,821,915 A | | 4/1989 | Mayer ........................ 220/441 |
| 4,840,828 A | * | 6/1989 | Bottger et al. ............... 428/120 |
| 4,871,078 A | | 10/1989 | Sharp ......................... 220/1 B |
| 4,998,435 A | | 3/1991 | Miller et al. .................. 73/40.7 |
| 5,175,034 A | | 12/1992 | Andre De La Porte .... 428/36.9 |
| 5,222,769 A | | 6/1993 | Kaempen ...................... 285/45 |
| 5,267,670 A | * | 12/1993 | Foster ............................ 222/1 |
| 5,271,982 A | | 12/1993 | Verpoest et al. ............... 428/86 |
| 5,300,336 A | * | 4/1994 | Wong et al. ................ 428/35.9 |
| 5,480,697 A | * | 1/1996 | Bottger et al. ................. 428/86 |
| 5,534,318 A | | 7/1996 | Andre De La Porte .... 428/36.1 |
| 5,763,035 A | | 6/1998 | Andre De La Porte .. 428/36.91 |
| 5,904,265 A | | 5/1999 | Zandbergen et al. ..... 220/62.19 |
| 5,918,267 A | | 6/1999 | Evans et al. .............. 73/40.5 R |
| 6,026,862 A | * | 2/2000 | Friedrich et al. ........... 138/112 |

\* cited by examiner

Primary Examiner—Patrick Brinson
(74) Attorney, Agent, or Firm—Mark D. Bowen, Esq.; Stearns Weaver Miller Weissler Alhadeff & Sitterson, P.A.

(57) ABSTRACT

A system and method for providing secondary containment for pipeline transmission systems that complies with environmental regulations for double wall applications. The outer surface of the pipeline is adapted with an epoxy bonded multi-ply fabric that forms a secondary containment structure external to the pipe with first and second spaced layers forming an interstitial space therebetween. An external coating of cured epoxy resin provides resistance to impact, abrasion, and chemically induced corrosion and deterioration. Probes may be installed at various locations along the pipeline for continuously sampling the environment within the interstitial space thereby providing leak detection. Secondary containment is constructed on an existing section of, steel, iron, fiberglass, composite, metal alloys, or concrete pipe.

4 Claims, 4 Drawing Sheets

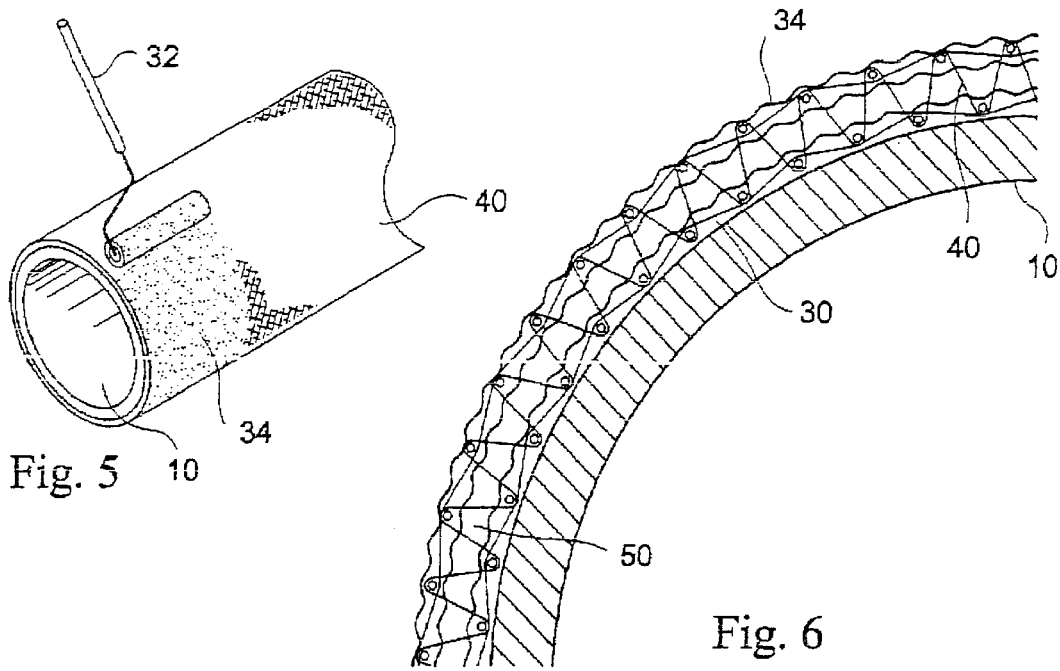
Fig. 5
Fig. 6
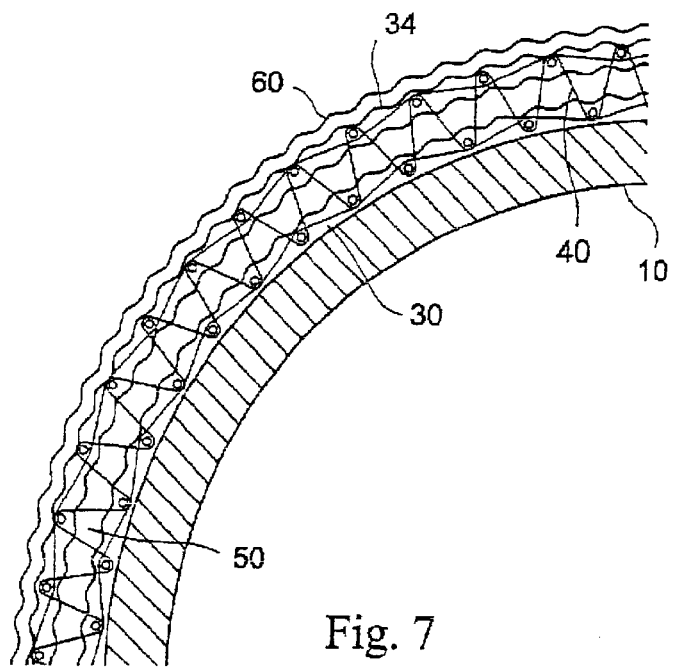
Fig. 7

SECONDARY CONTAINMENT SYSTEM FOR PIPELINES

CROSS-REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights.

BACKGROUND OF THE INVENTION

1. Field of the Invention

The present invention relates to pipelines that carry hydrocarbon products and other hazardous fluids, and more particularly, to an external three-dimensional secondary containment structure for pipeline transmission systems.

2. Description of Related Art

Pipeline transmission systems are in widespread use in the production, transportation, and distribution of oil, gas, water, hydrocarbon fluids such as petroleum products, and other hazardous fluids. Most pipeline transmission systems are constructed from welded single wall steel or aluminum pipe. Since at least the early 1950's, single wall pipe sections have been externally and internally coated with various fusion bonded epoxy ("FBE") coatings to provide corrosion protection. While these early FBE formulations provided adequate corrosion resistance, they were known to suffer from a number of significant disadvantages. A significant disadvantage with FBE coatings relates to the procedures required to cure the coating. In particular, FBE coatings require baking at elevated temperatures to properly cure. In addition, FBE pipe coatings are expensive, and difficult and time consuming to apply due largely to curing requirements. In addition, once cured FBE coatings can be brittle and prone to chipping and cracking during handling and installation.

More recently, environmental concerns and legislative action have resulted in further efforts directed to reducing the potential for environmental contamination by improving the structural integrity and reliability of pipeline transmission systems. Since many pipelines carry liquids that are highly flammable, toxic, or corrosive, preventing leaks and the resulting environmental contamination is of paramount concern in the operation of pipeline transmission systems. As a result, various federal, state, and local governmental agencies, such as the United States Environmental Protection Agency (EPA), now require that pipelines conveying hazardous liquids or gases be adapted with secondary containment capabilities to prevent and/or reduce leak-related environmental contamination.

As a result of these concerns, risks, and potential liabilities, many owners and operators of pipeline transmission systems have experimented with the use of various secondary containment systems. One known method of providing secondary containment involves the installation of pipelines within a trench lined with an impermeable liner. Trench-type containment systems, however, are expensive to install, difficult to maintain, and are not suited for applications wherein a body of water must be traversed. Another common method for providing secondary containment involves the utilization of double-wall pipe, wherein radially spaced inner and outer pipe walls define an annular void for containing leaks. The use of double wall pipe, however, substantially increases material and installation costs. In addition, double wall pipe is less resistant to corrosion due to the bonding of metal to metal to form the pipe. Accordingly, the owners and operators of pipeline transmission systems are in need of an improved means for providing a secondary containment system that is reliable and cost effective.

The background art reveals several attempts to provide secondary containment systems and methods of leak detection suitable for use with pipelines. For example, U.S. Pat. No. 3,882,382, issued to Johnson, discloses a leak detecting conduit cover comprising ring-like sections sized for installation in surrounding relation with the pipe to be protected. The ring-like sections include an outer protective metallic cover plate, an insulating panel, and an electrically energized metal mesh that is electrically isolated from the other components. The components are configured such that moisture leaking from the conduit bridges a gap between the metal mesh and the outer metallic cover thereby completing a circuit and triggering an alarm or indicating signal. Another example is disclosed in U.S. Pat. No. 4,468,609, wherein there is disclosed a control system for detecting leaks in insulation-jacketed pipes. The system includes a heat-insulating jacket having radially open measuring chambers for receiving measuring probes, each of which has two electrodes arranged at sectional intervals and connected to an evaluation circuit. In addition, U.S. Pat. No. 4,821,915, issued to Mayer, discloses a double-wall pipe structure wherein a coupler assembly incorporates a leak-detecting sensor. U.S. Pat. No. 5,918,267, issued to Evans et al., discloses a system for detecting leaks from buried pipes that relies on a fabric fluid-wicking member that lies beneath the pipe and a fluid sensor in contact with the wicking member. Fluid leaking from the pipe is brought into contact with the sensor by the wicking member. These secondary containment systems are burdened with a number of disadvantages, reliability problems, cost issues, and complexities.

Secondary containment systems are also employed with aboveground and underground storage tanks. U.S. Pat. No. 4,523,454, issued to Sharp, discloses a storage tank system for storing liquid gasoline comprising a rigid inner tank encased by a flexible outer jacket with a leak detecting means associated with the space between the inner tank and jacket. Leak detection is achieved by detecting pressure fluctuations in the closed space. Positive pressurization is preferred, however, a vacuum may be used provided reinforcing members are incorporated to maintain the spaced relationship between the inner tank and outer jacket. U.S. Pat. No. 4,653,312, also issued to Sharp, discloses a method of fabricating a jacketed storage tank according to a method requiring the application of a separating agent over the storage tank, applying a layer of fibrous reinforcing material on the separating agent, and thereafter applying a resinous material. The separating agent insures that a subsequently applied fibrous reinforcing material will not adhere to the inner storage tank. U.S. Pat. No. 4,696,186, also issued to Sharp, discloses a storage tank system for storing liquid gasoline wherein a rigid inner tank is encased by a flexible outer jacket with a leak detecting means associated with the closed space therebetween. In this patent, Sharp discloses the use of gas pervious material to occupy the closed space between the tank and jacket.

U.S. Pat. No. 4,821,915, issued to Mayer, discloses a twin wall fiberglass tank having an inner wall, an outer wall, and a core disposed between the inner and outer walls which forms a plurality of air gaps. U.S. Pat. No. 4,871,078, issued to Sharp, discloses a method of making a jacketed storage tank comprises applying an open-cell synthetic foam over a rigid inner storage tank, applying a layer of fibrous reinforcing material on the separating agent, and applying a resinous material. U.S. Pat. No. 4,998,435, issued to Miller, discloses a method of testing pipe sections at an oil-rig floor by means of an internal pipe testing tool. U.S. Pat. No. 5,222,769, issued to Kaempen, discloses a double-wall composite pipe structure having separated impermeable inner and outer walls. U.S. Pat. No. 5,918,267, issued to Evans, discloses a system for detecting leaks from buried pipes that transport fluids other than water. U.S. Pat. No. 5,904,265, issued to Zanbergen et al., discloses a tank with inner and/or outer double-walled lining formed by a double walled cladding adhered to the outer surface and consisting of a double pile fabric which is reinforced by a curable impregnated resin, such that the upper and lower fabric are connected in spaced relation by means of webs formed by pile threads.

The secondary containment systems and methods disclosed in the background art have not gained widespread acceptance largely due to the complexity of installation, reliability and cost. Another significant disadvantage with secondary containment systems of the background art is a lack of impact resistance. Accordingly, there exists a need for an improved secondary containment system for use primarily with aboveground and/or underground pipelines.

BRIEF SUMMARY OF THE INVENTION

The present invention provides a system and method for providing secondary containment and leak detection for pipeline transmission systems. The system and methods disclosed herein provide a secondary containment system for pipelines which complies with environmental regulations for double wall applications. The present invention provides a secondary containment system for pipeline transmission systems wherein the external surface is supplemented with an resin bonded multi-ply fabric which forms a secondary containment structure external to the pipe with first and second spaced layers forming an interstitial space therebetween. An external coating of cured resin, such as epoxy resin, provides resistance to impact, abrasion, and chemically induced corrosion and deterioration. Probes may be installed at various locations along the pipeline for continuously sampling the environment within the interstitial space thereby providing leak detection.

Secondary containment is constructed on an existing section of, steel, iron, or concrete pipe in accordance with the following procedures. The outer surface of the pipe provides a substrate for application of the secondary containment system. As applied to steel pipe, the instant method generally includes the following steps: (1) preliminary surface preparation to provide a suitable substrate for application of the secondary containment system; (2) application of an optional primer coat (depending on the pipe material); (3) initial lay-out, measuring, and cutting of multi-ply fabric comprising an upper fabric and a lower fabric which are held together by connecting pile threads; (4) application of a liquid epoxy resin to the outer surface of the pipe; (5) application of multi-ply fabric sections into the wet epoxy film using roller to remove entrapped air; (6) application of an additional coating of epoxy resin to ensure complete saturation; (7) curing of the cloth/epoxy composite, which results in the separation of the upper and lower fabric to form an interstitial space therebetween; (8) application of a layer of impact and chemically resistant curable resin to form an outer shell; and (9) installation of an optional monitoring system capable of interstitial monitoring at approximately 1000 ft. sampling intervals.

Accordingly, it is an object of the present invention to provide a secondary containment system for aboveground and underground pipelines.

Still another object of the present invention is to provide a method for installing a secondary containment system on pipelines that provides an interstitial space suitable for use in leak detection.

Yet another object of the present invention is to provide a secondary containment system for pipelines that results in multiple corrosion resistant outer layers to protect the enclosed pipeline from corrosion induced failure.

In accordance with these and other objects that will become apparent hereinafter, the instant invention will now be described with particular reference to the accompanying drawings.

BRIEF DESCRIPTION OF THE SEVERAL VIEWS OF THE DRAWINGS

FIG. 5 illustrates application of a second layer of resin over the multi-ply fabric to insure adequate saturation;

FIG. 6 is a partial sectional end view thereof depicting the cured containment structure forming an interstitial space;

FIG. 7 is a partial sectional end view thereof depicting the application of a fast curing resin coating to provide an outer shell that is resistant to chemically induced corrosion, abrasion, and impact;

DETAILED DESCRIPTION OF THE INVENTION

Figure 1:
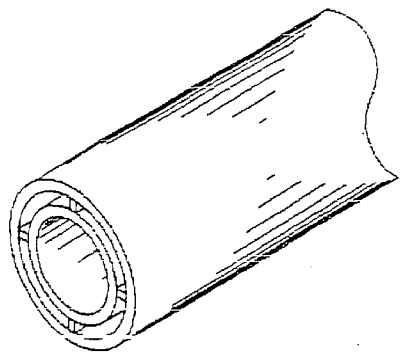
FIG. 1 is a sectional view of a double wall pipe known in the background art.

With reference now to the drawings there is depicted a secondary containment system for pipelines that complies with environmental regulations and double wall requirements for exterior pipeline applications. FIG. 1 depicts a double wall pipe according to the prior art. Secondary containment according to the present invention is achieved on pipeline transmission systems by providing the external surface with a layer of resin that bonds a multi-ply fabric comprising a sheet-like material formed by a winding of high-strength fibers to the pipe. The method of installation results in the multi-ply fabric forming a secondary containment structure wherein a first fabric layer is bound to the outer pipe wall and the second fabric layer is radially spaced therefrom and bound thereto by cross-wound fibers to form an interstitial space therebetween. An external coating of cured resin provides resistance to impact, abrasion, and chemically induced corrosion and deterioration. Probes may be installed for continuously sampling the environment within the interstitial space thereby providing leak detection.

As illustrated in FIGS. 2–13, the secondary containment technology disclosed herein may be applied to pipe sections, generally referenced as 10, prior to installation or to exiting pipelines, and may be applied to steel, iron, aluminum, titanium, metal alloys, composites, fiberglass, and/or concrete pipe according to the methods disclosed herein. The secondary containment technology disclosed herein may be applied to pipe sections prior to installation or to exiting pipelines. Installation procedures in applications involving exiting pipelines should insure that the pipeline is completely isolated prior to commencement. Any manifold lines, such as vents, fill or suction fittings, shall be blanked off from other tanks or lines that are to remain in service during installation. Steps are taken to insure proper grounding and to prevent the accumulation and discharge of static electricity during the blasting and coating operation.

The method includes preliminary preparation of the pipe surface to produce a suitable surface for epoxy resin bonding. All surfaces are tested to determine the level of soluble chloride with a surface contamination analysis test kit and a pH test kit. The maximum allowable level of soluble chlorides is 100 parts-per-million (ppm). Any protuberances in the existing pipe outer wall are eliminated by abrasive sandblasting, or other suitable means, to render the exterior pipe wall generally smooth. In addition, any protruding irregularities are repaired or removed to provide an uninterrupted continuity to the exterior pipe wall. The outer wall is visually inspected for any other surface contamination such as oil, grease, dirt, debris, or other foreign contamination that may interfere with coating adhesion to the outer pipe wall. If any contamination is detected the outer pipe wall must be cleaned using a fresh water pressure wash, steam cleaning, or other appropriate cleaning agent.

Figure 2:
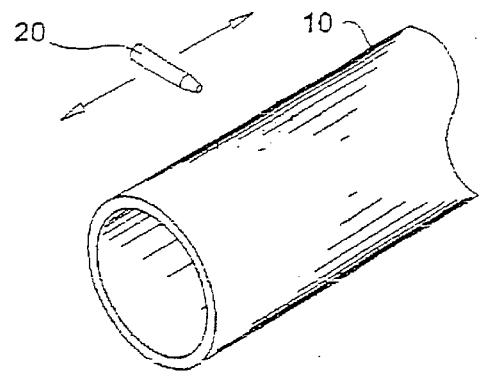
FIG. 2 illustrates surface preparation of a pipe section in accordance with the present invention.

Once all anomalies have been adequately repaired and the substrate is in acceptable condition, abrasive blast cleaning is performed as illustrated in FIG. 2. In a preferred embodiment, blast apparatus and blast media, referenced as 20, are selected so as to result in the formation of a minimum 3.0 mil jagged-profile in the substrate. Alternate blast-cleaning techniques are used in applications involving concrete substrate. Upon completion of the blast cleaning process, the surface is cleaned using compressed air to remove any surface residue. A primer may be used in applications involving steel pipe. A suitable primer, identified as ENVIROLINE® 58, is available from Industrial Environmental Coatings Corporation of Pompano Beach, Fla. The primer is preferably applied to a wet film thickness of 4.0 to 6.0 mils so as to dry to a uniform dry film thickness of 2.0 to 3.0 mils. Subsequent coatings may be applied in certain applications. Concrete pipe applications require the use of a concrete sealer. A suitable concrete sealer, identified as ENVIROLINE® 54 (or 57X), is available from Industrial Environmental Coatings Corporation.

A multi-ply fabric is used in combination with epoxy resin to form a secondary containment structure in accordance with the present invention. The multi-ply fabric comprises a double pile fabric wherein upper and lower fabric layers formed of warp and weft threads and connected by interwoven tied-in pile threads. Such cloth is disclosed in U.S. Pat. No. 5,175,034, and is available from Parabeam Industries, Al Helmond, Netherlands. The fabric is cut to conform to the area of pipe upon which the cut section will be installed. In particular, the fabric is cut such that the cut portion covers the pipe diameter, e.g. extends fully about the circumference. In applications involving new pipe sections, the fabric is cut such that a cutback of approximately 6 inches is formed at each end to allow for girth welds to be installed in the field and subsequently covered.

Figure 3:
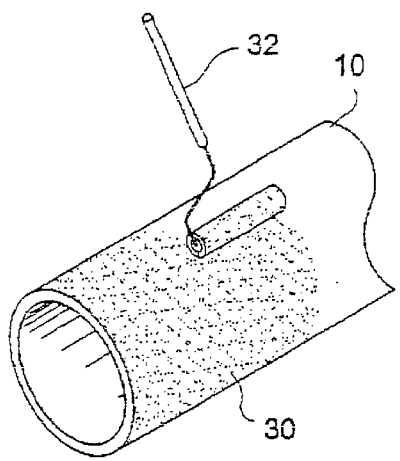
FIG. 3 illustrates application of resin to the pipe section depicted in FIG. 2.
Figure 3A:
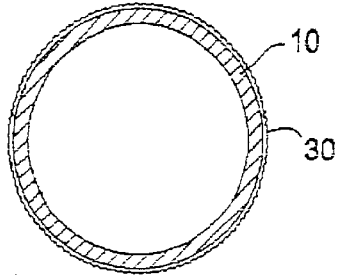
FIG. 3A is an end view of the pipe section with resin applied.

As best seen in FIG. 3, a suitable resin, such as an epoxy resin 30, is applied to is the previously prepared and primed pipe. The resin is preferably a 100% solids epoxy resin compound specifically formulated so as to be translucent for reasons discussed hereinbelow. A suitable resin, identified as ENVIROLINE® 199, is available from Industrial Environmental Coatings Corporation. The resin coating may be applied by plural component, airless spray, or by roll technique, illustrated by roller 32. It is important that the resin be applied to the pipe substrate to form a uniform film thickness that is liquid and gel-free to insure adequate wetting of the fabric upon installation. FIG. 3A depicts an end view of a pipe section having a resin coating on the external surface thereof. In applications wherein the resin is applied by spray techniques, a tip size of 0.019 to 0.023 is preferred. In applications wherein the epoxy is applied by roller, a ¼ inch nap roller is preferred. The resin is preferably applied to form a uniform coating of between 20–30 mils wet film thickness. The Enviroline 199 preferably comprises a curable resin consisting of two components, that when combined form a generally clear substance. The use of a generally clear substance is significant as it allows the installer to confirm that the multi-ply material is adequately saturated by visual inspection.

Figure 4:
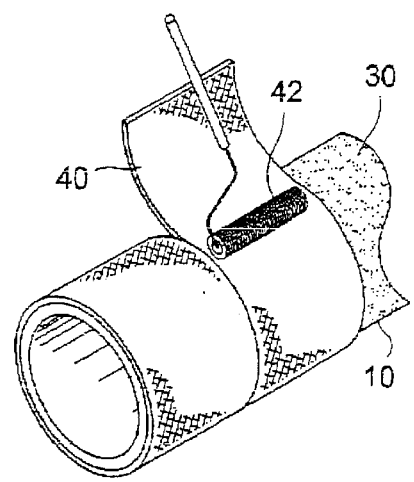
FIG. 4 illustrates application of a multi-ply fabric to the pipe section depicted in FIGS. 3 and 3A.
Figure 4A:
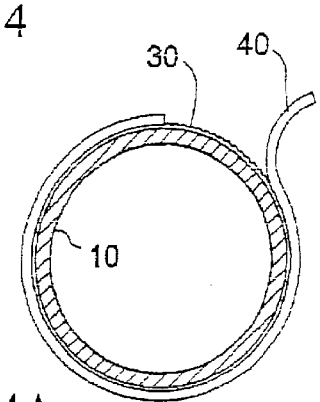
FIG. 4A is an end view thereof.

As illustrated in FIGS. 4 and 4A, the freshly applied resin coating 30 forms a wetted substrate for receiving the previously cut multi-ply fabric 40. Thus, for the given area coated, a corresponding pre-cut multi-ply fabric piece 40 is applied in covering relation on the outer surface of the pipe. Immediately upon placing the fabric in contact with the wet epoxy, an aluminum roller 42 having a serrated surface is used to press the fabric into the epoxy film so as to remove wrinkles, force out any entrapped air and insure a thorough wetting of the fabric. Next, as seen in FIG. 5, an additional coating of epoxy resin, referenced as 34, is applied over the multi-ply fabric using an applicator, such as a roller 32, to insure complete saturation. In a preferred embodiment, the additional coat is applied to form a coating 10–20 mils wet film thickness. Visual inspection insures proper and uniform wetting of the multi-ply fabric. Excess epoxy is preferably removed using a serrated or ¼ inch nap roller applied over the fabric. The use of a translucent epoxy resin coating is critical in that it allows for visual inspection of the extent to which the fabric is saturated. The use of a translucent resin allows the installer to visually determine whether the epoxy has completely saturated the multi-ply fabric. Additional resin may be applied to insure total saturation. As the resin cures, the upper and lower fabric layers separate thereby forming an interstitial space therebetween 50 as best depicted in FIG. 6. Thus, the upper and lower fabric layers form upper and lower boundaries for the interstitial space. The fabric will typically expand such that the upper and lower fabric layers are spaced approximately 1–6 mm. The epoxy securely bonds the lower layer to the outer surface of the pipe, and the outer fabric layer is radially spaced therefrom.

Figure 8:
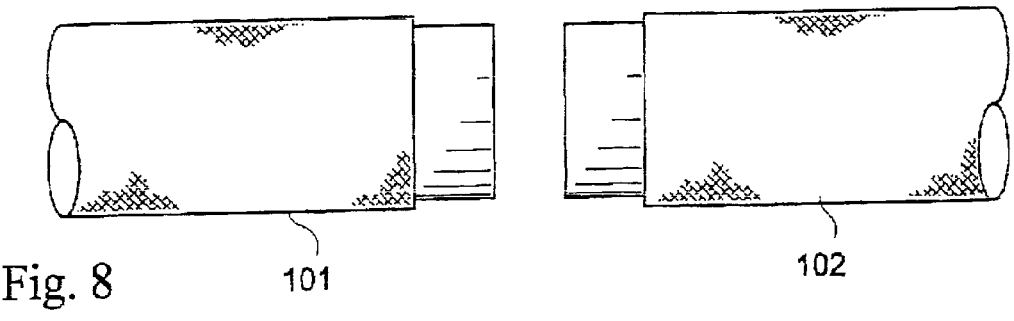
FIG. 8 depicts two pipe sections with previously applied secondary containment barriers according to the present invention prior to being joined to form a pipeline.
Figure 9:
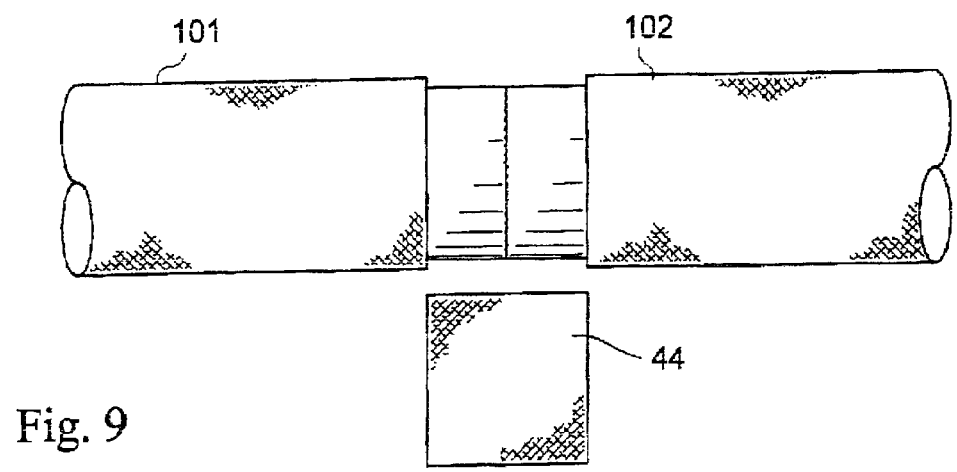
FIG. 9 depicts the joining and welding of the pipe sections shown in FIG. 8, and the layout of material to cover the exposed girth weld area.
Figure 10:
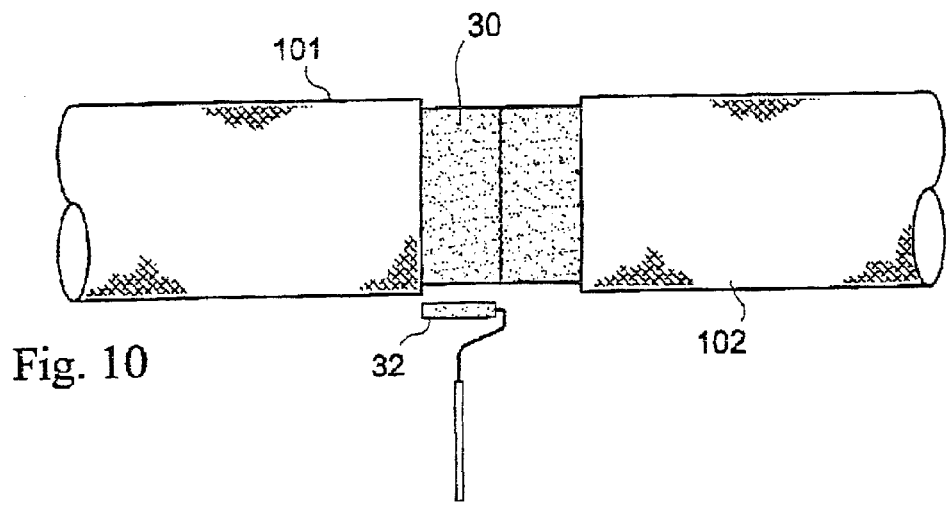
FIG. 10 depicts the application of a resin layer over the girth weld area.
Figure 11:
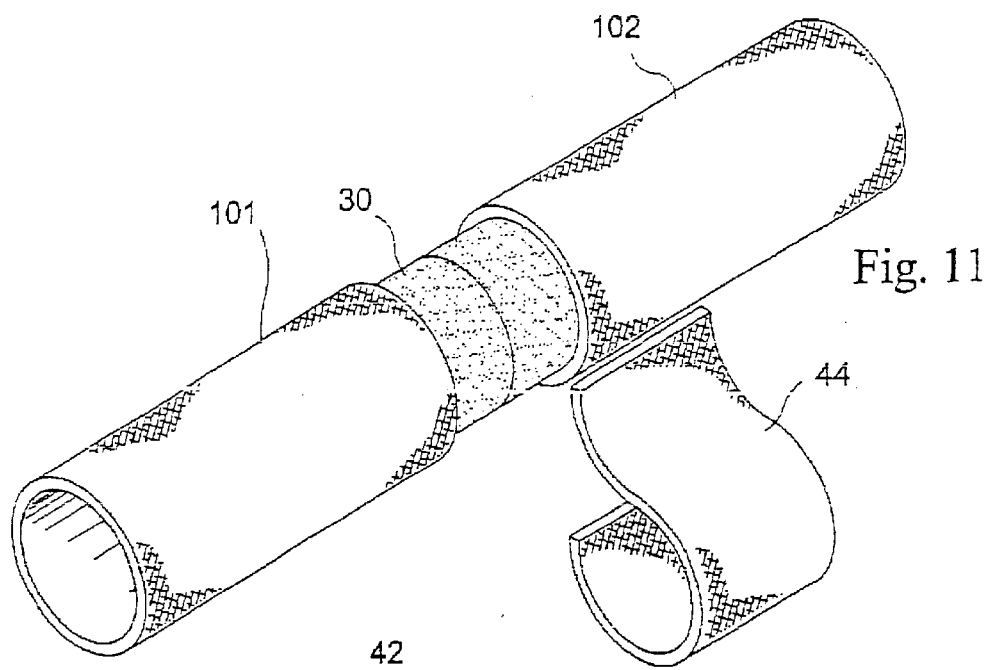
FIG. 11 depicts the application of the multi-ply fabric over the girth weld area.
Figure 12:
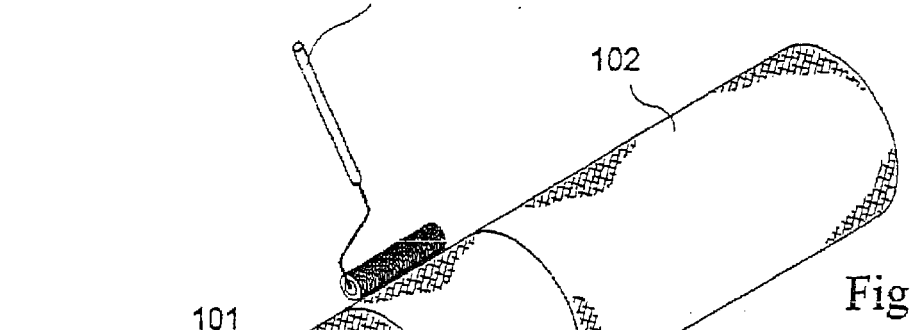
FIG. 12 depicts the application of additional resin over the multi-ply fabric.

FIGS. 8–13 depict the formation of a secondary containment barrier to pipe sections joined to from a continuous pipeline. FIG. 8 depicts two un-joined pipe sections, referenced as 101 and 102, each having a previously applied secondary containment system applied thereto with bare pipe left on the end of each section for forming a girth weld. FIG. 9 depicts the welded connection of pipe sections 101 and 102 and the layout of multi-ply material 44 to cover the exposed ends to form a continuous secondary containment structure. Preferably the surfaces adjacent to the girth weld have been previously prepared and primed as set forth hereinabove. FIG. 10 depicts the application of a resin coating 30 using a roller 32 in accordance with the steps disclosed hereinabove. FIGS. 11 and 12 depict the application of the multi-ply fabric and resin coatings over the girth weld area in abutting relation with the ends of the previously applied material to form a continuous secondary containment barrier.

Figure 13:
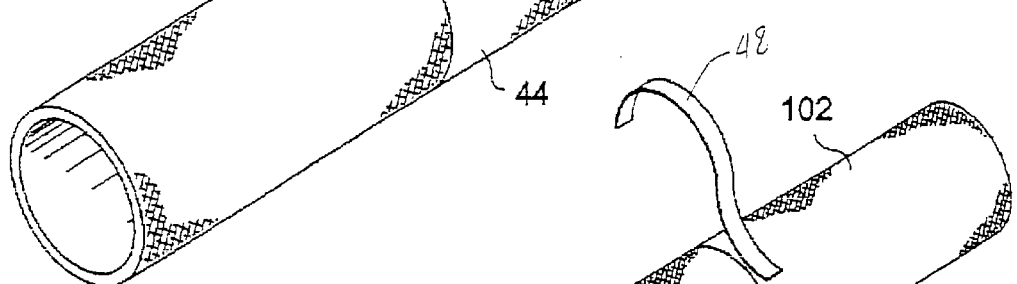
FIG. 13 depicts the application of stitching layers over the seams formed by adjacent sections.
Figure 13:
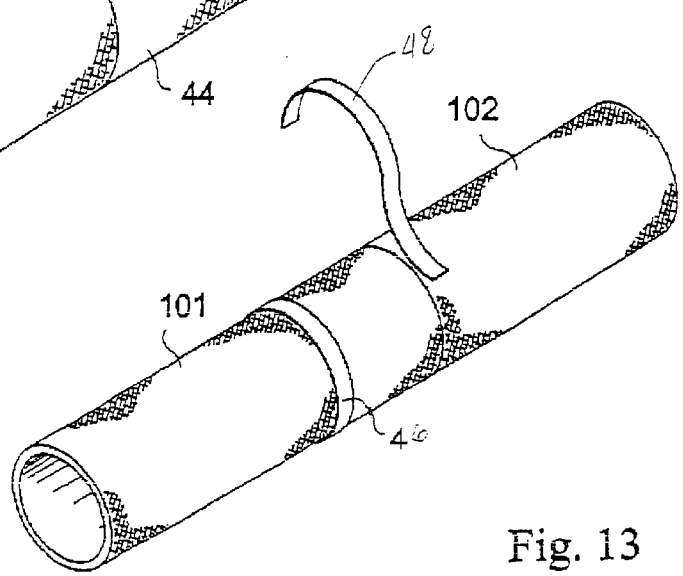

As illustrated in FIG. 13, seams are covered with strips of multi-ply fabric, referenced to herein as stitch tape 46 and 48, in accordance with the previously described methods. Specifically, application of the stitch tape is accomplished by first applying a curable resin (ENVIROLINE® 199) to the area of the seam and to adjacent surrounding areas to be covered by the stitch, plus one inch on both sides. The resin is preferably applied at 20–30 mils wet film thickness. The stitch tape is applied over the seam area and rolled into the resin using serrated aluminum rollers. An additional layer of resin is applied over the stitch tape in accordance with the methods disclosed hereinabove. A uniform and adequate distribution of the resin is required such that the stitch tape is completely saturated to ensure an airtight seam. Accordingly, once the installation is substantially complete, the multi-ply fabric is securely bonded to the outer surface of the pipe to define an interstitial space between the first and second fabric layers, and all seams (longitudinal and circumferential) are secured with stitch tape.

As illustrated in FIG. 7, an outer shell 60 is next formed over the multi-ply fabric to provide resistance to impact, abrasion, and chemically induced corrosion. Since many pipelines are installed buried in the earth and thus potentially exposed to various chemicals due to condensation and prior chemical contamination of the surrounding soil, the present invention specifically includes an additional outer shell to protect the underlying secondary containment structure. In a preferred embodiment, a fast curing single coat 100% solids epoxy resin comprises the substance forming outer shell 60. A suitable resin identified as ENVIROLINE® 376 and available from Industrial Environmental Coatings provides the preferred substance for forming the outer shell. The resin is preferred due to its rapid curing quality which prevents the epoxy from seeping into the interstitial space formed by the underlying multi-ply fabric and cured resin structure. Once cured, the '376 epoxy coating is extremely resistant to chemically induced corrosion, impact, and abrasion.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A pipeline transmission system formed of connected pipe sections having a secondary containment structure bonded to the outer surfaces of the pipe sections with sufficient resistance to chemical corrosion, abrasion, and impact, said pipeline system comprising:

a pipeline for conveying various fluids therethrough;

a multi-ply fabric in external covering relation with an outer surface of said pipeline, said multi-ply fabric having a first layer bonded to said pipeline outer surface and a second layer spaced from said first layer thereby forming an interstitial secondary containment space between said first and second layers;

said second layer consisting of a coating of cured resin for providing resistance to impact, abrasion, and chemically induced corrosion and deterioration.

2. A pipeline transmission system according to claim 1, wherein said second layer coating comprises a cured coating selected to have rapid curing characteristics.

3. A pipeline transmission system according to claim 1, wherein said second layer coating comprises a cured resin coating having high resistance to chemical corrosion.

4. A method of construction for a pipeline transmission system formed of connected pipe sections having a secondary containment structure bonded to the outer surfaces of the pipe sections with sufficient resistance to chemical corrosion, abrasion, and impact:

said pipeline transmission system including a pipeline for conveying various fluids therethrough, a multi-ply fabric in external covering relation with an outer surface of said pipeline, said multi-ply fabric having a first layer bonded to said pipeline outer surface and a second layer spaced from said first layer thereby forming an interstitial secondary containment space between said first and second layers, said second layer having a coating of cured resin for providing resistance to impact, abrasion, and chemically induced corrosion and deterioration;

said method of construction comprising the steps of:
   (1) preparing the outer surface of said pipeline to provide a suitable substrate for application of an epoxy bonded secondary containment system;
   (2) initial lay-out, measuring, and cutting of a multi-ply fabric, said multi-ply fabric including an upper fabric layer and a lower fabric layer which layers are connected by a plurality of pile threads;
   (3) application of a curable liquid resin to an outer surface of section of pipe;
   (4) application of multi-ply fabric sections into the wet epoxy film using roller to remove entrapped air;
   (5) application of an additional coating of epoxy resin to ensure complete saturation, whereby curing of the resin results in the separation of the upper and lower fabric to form an interstitial space therebetween;
   (6) application of a layer of impact and chemically resistant resin to form an outer shell.

* * * * *